US006069841A

United States Patent [19]

Johnston

[11] Patent Number: 6,069,841

[45] Date of Patent: May 30, 2000

[54] PRESSURIZED LEAD-IN FOR A SEISMIC STREAMER CABLE

[75] Inventor: Otis A. Johnston, Richmond, Tex.

[73] Assignee: Western Atlas International, Inc., Houston, Tex.

[21] Appl. No.: 09/062,260

[22] Filed: Apr. 17, 1998

[51] Int. Cl.[7] ....... G01V 1/00

[52] U.S. Cl. ....... 367/20; 367/154; 339/49 R; 73/151

[58] Field of Search ....... 367/14, 20, 177, 367/154; 174/52, 84; 285/24, 184; 339/49 R; 73/151

[56] References Cited

U.S. PATENT DOCUMENTS

| | | | |
|---|---|---|---|
| H113 | 8/1986 | McNeel | 339/105 |
| 3,914,014 | 10/1975 | James | 339/104 |
| 3,939,466 | 2/1976 | Horwath | 340/7 R |
| 3,993,859 | 11/1976 | McNeel | 174/52 |
| 3,997,230 | 12/1976 | Secretan | 339/49 R |
| 4,003,620 | 1/1977 | O'Brien et al. | 339/29 R |
| 4,059,819 | 11/1977 | Mollere | 340/8 LF |
| 4,092,629 | 5/1978 | Siems et al. | 340/15.5 TS |
| 4,114,970 | 9/1978 | Hall, Jr. | 339/49 R |
| 4,180,103 | 12/1979 | Mollere | 138/109 |
| 4,351,036 | 9/1982 | Mollere | 367/20 |
| 4,470,134 | 9/1984 | McNeel | 367/188 |
| 4,526,430 | 7/1985 | Williams | 339/45 M |
| 4,682,831 | 7/1987 | McNeel et al. | 439/294 |
| 4,809,243 | 2/1989 | Bledsoe et al. | 367/154 |
| 4,907,828 | 3/1990 | Chang | 285/24 |
| 4,941,349 | 7/1990 | Walkow et al. | 73/151 |
| 5,043,949 | 8/1991 | Shechter | 367/76 |
| 5,144,588 | 9/1992 | Johnston et al. | 367/16 |
| 5,183,966 | 2/1993 | Hurtado et al. | 474/20 |
| 5,271,081 | 12/1993 | Khalil | 385/112 |
| 5,796,676 | 8/1998 | Cang et al. | 367/20 |
| 5,835,450 | 11/1998 | Russell | 367/20 |

*Primary Examiner*—Christine Oda
*Assistant Examiner*—Anthony Jolly
*Attorney, Agent, or Firm*—Alan J. Atkinson

[57] ABSTRACT

A seismic lead-in for a seismic streamer cable has been invented which, in certain aspects, has at least one stress member, the at least one stress member having an interior surface, a first sealing member adjacent the interior surface of the at least one stress member, at least one transmission element positioned within the at least one stress member, the at least one transmission element having an outer surface, a second sealing member adjacent the outer surface of the at least one transmission element, and a fluid in a space, the space defined by and between the first sealing member and the second sealing member. In one aspect the lead-in also includes a housing enclosing one or both ends of the lead-in. In one aspect the lead-in has a port through an end housing extending to the space for introducing fluid into the space and for removing it therefrom.

12 Claims, 2 Drawing Sheets

H 3 24 10 J 14 L 17 3 16 22 20 18

G
F
P
H
L
A
K
C
J
B
I
E

H
3
24
10
J
14
L
17
3
16
22
20
18

G
H
F
10
A
L
K
C
12
J
B
E
14
M

PRESSURIZED LEAD-IN FOR A SEISMIC STREAMER CABLE

BACKGROUND OF THE INVENTION

1. Field of the Invention

This invention is directed to lead-ins for seismic streamer cables.

2. Description of Related Art

In various prior art streamer cable lead-ins, electrical and/or optical elements within a lead-in are directly stressed by other solid elements within the lead-in. Such solid elements include inner jackets adjacent the electrical and/or optical elements and stress members (e.g. armor wires) adjacent either an inner jacket or adjacent the electrical and/or optical elements. Thus subjecting the electrical and/or optical elements to localized pressure points can, over time, result in degraded signals and, in many cases, elements so damaged that signal transmission therethrough is halted. In one instance heavy loading on helically applied armor wire decreases the wire's diameter and the load is transmitted unevenly to electrical/optical assemblies within the armor wire.

There has long been a need for a seismic streamer cable lead-in in which electrical and/or optical elements are not subjected to damaging loads. There has long been a need for such a lead-in with which signals are not degraded by the application of a load to the lead-in.

SUMMARY OF THE PRESENT INVENTION

The present invention, in certain aspects discloses a seismic streamer cable lead-in having outer end housings or bend restrictors, one or more stress members, an intermediate space within the stress member(s) filled with a fluid. In one aspect the fluid is not under pressure. In another aspect, the fluid is under pressure. In certain aspects the fluid is a viscous liquid, a viscous material, or a gel, which is not under pressure. There are one or more encased electrical elements within the intermediate space. One or more optical elements may be positioned within the intermediate space instead of or in addition to the one or more electrical elements.

In one aspect, the end housings are made of a suitable plastic (e.g. but not limited to, castable polyurethane) that is sufficiently rigid to inhibit bending of components of the lead-in. In one aspect a plurality of armor wires are wrapped around an outer jacket that defines an outer boundary of the intermediate space. In certain aspects the outer jacket is made of mylar tape or is a thermoplastic tube. An inner boundary of the intermediate space is defined by an inner jacket that encompasses the electrical and/or optical elements. The outer and inner jackets sealingly enclose the intermediate space.

The fluid in the intermediate space may be any suitable gas or mixture of gasses (e.g., but not limited to air, nitrogen, inert gasses, etc.) or any suitable liquid (e.g. but not limited to water, or glycol solutions). In certain aspects the fluid is a gas/liquid combination.

In one aspect, the stress member(s) are surrounded by a reinforcer, e.g., but not limited to reinforcing dacron cordage wrapped around armor wires. In one aspect the armor wires or cordage-enclosed armor wires are encased in an exterior jacket (e.g., but not limited to, an exterior jacket of polystyrene). Interstices within the lead-in may be filled with suitable known fillers. In certain aspects a pressurized fluid space is provided around an individual conductor or only some of the conductors.

It is, therefore, an object of at least certain preferred embodiments of the present invention to provide:

New, useful, unique, efficient, nonobvious devices and methods for seismic streamer cable lead-ins in which electrical and/or optical elements and/or assemblies are segregated from damaging stressful effects of loads to which a lead-in is subjected;

Such lead-ins with fluid in a space between protective stress members and electrical and/or optical element(s) and, in certain aspects, such lead-ins in which the fluid is gas and/or liquid under pressure;

Such lead-ins with a plurality of electrical conductors and at least one optical transmission element; and Such lead-ins with a body and a port therethrough for selectively introducing pressurized fluid into a body of a lead-in.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 1 is a cross-sectional view of a prior art lead-in.

DESCRIPTION OF EMBODIMENTS PREFERRED AT THE TIME OF FILING FOR THIS PATENT

Figure 1:
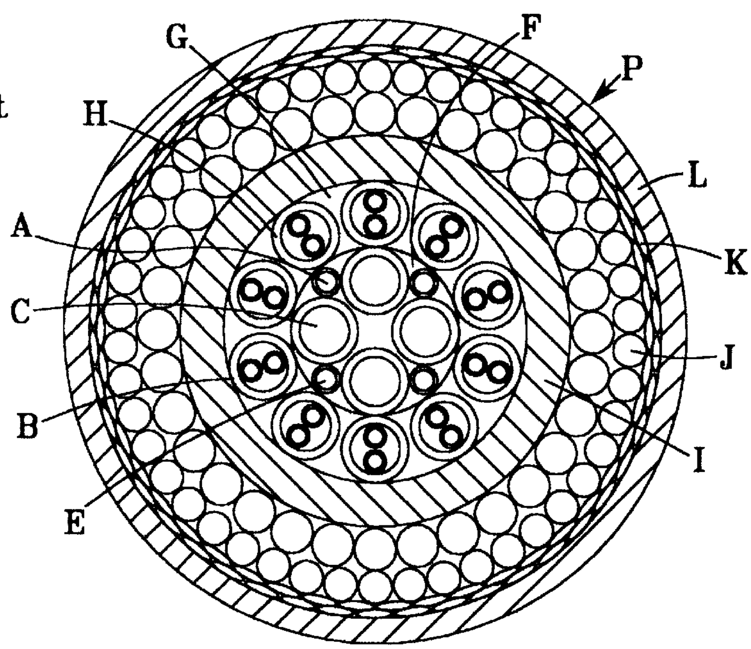

FIG. 1 shows a prior art lead-in P with an outer polystyrene jacket L surrounding a reinforcement layer K, e.g. of armor wires. Layers of helically-wound steel armor wires J within the layer K of armor wires surround an inner polyethylene jacket I. Encased within the jacket I are a plurality of paired conductors B, single conductors C, single conductors E, and a fiber optic tube A. Mylar tape D surrounds the conductors. The group of conductors are encased in and surrounded by PVC material, a thermoplastic tube, and/or Mylar Tape H. Interstices F and G between elements are filled with known fillers such as, but not limited to, hemp or a thermoplastic material.

Figure 2:
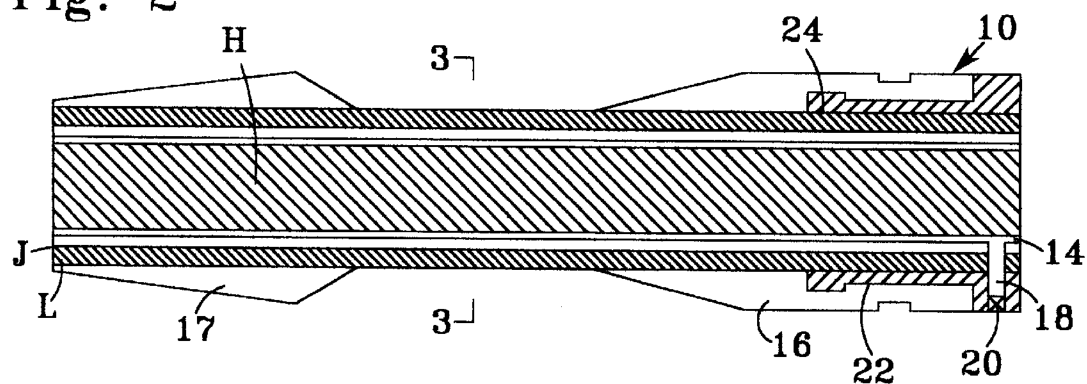
FIG. 2 is a side cross-sectional view of a lead-in according to the present invention.
Figure 3:
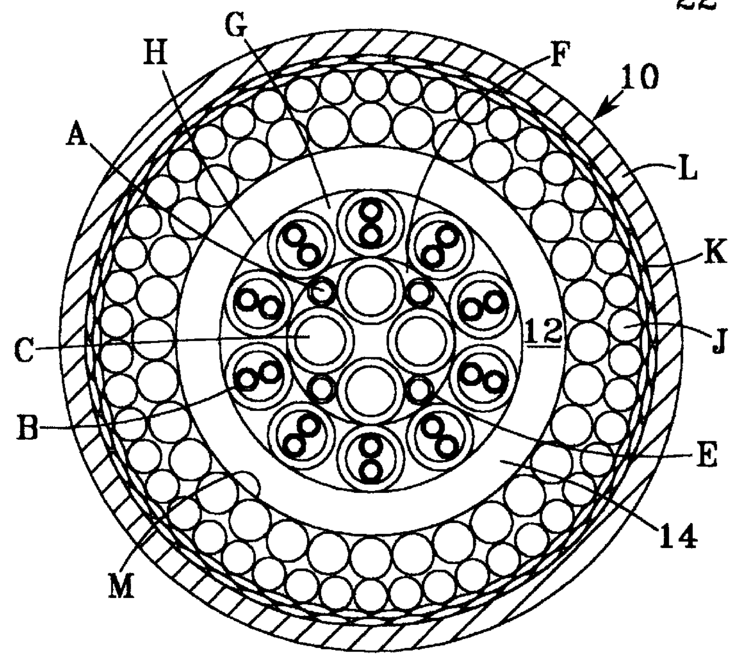
FIG. 3 is a cross-section view along line 3—3 of FIG. 2.

FIGS. 2 and 3 show a lead-in 10 according to the present invention with some parts that are like those of the lead-in P of FIG. 1 and similar identifying letters are used to indicate these similar parts. A fluid 12 under pressure is held within a sealed space 14 defined interiorly by tape H and exteriorly by a thermoplastic tube M. The fluid 12 may be gas or liquid. In certain aspects it is gas at a pressure ranging between 1,000 and 2,000 p.s.i., most preferably about 2,000 p.s.i. In certain aspects therein the fluid is liquid, it is at ambient pressure or it is at a pressure ranging between about 5 and about 100 p.s.i. In certain aspects the gas is air; an inert gas such as, but not limited to, nitrogen; and/or a mixture thereof. The jacket L is optional (shown in FIG. 3; not shown in FIG. 2).

As shown in FIG. 2 an end body or housing 16 of castable polyurethane surrounds one end of the lead-in 10. An end body 17 surrounds the other end. A port 18 extends through the end body 16 to the fluid space 14 and a valve device 20 selectively controls fluid flow in the port 18. Known and commercially-available sea-end and ship-end connectors are used with the lead-in 10, e.g. such as those supplied by Syntron Company. An armor pot 22 is used around the armor wires J at the sea end of the lead-in 10. An O-ring 24 seals the interface between the armor wires J and the interior of the armor pot 22.

Figure 4:
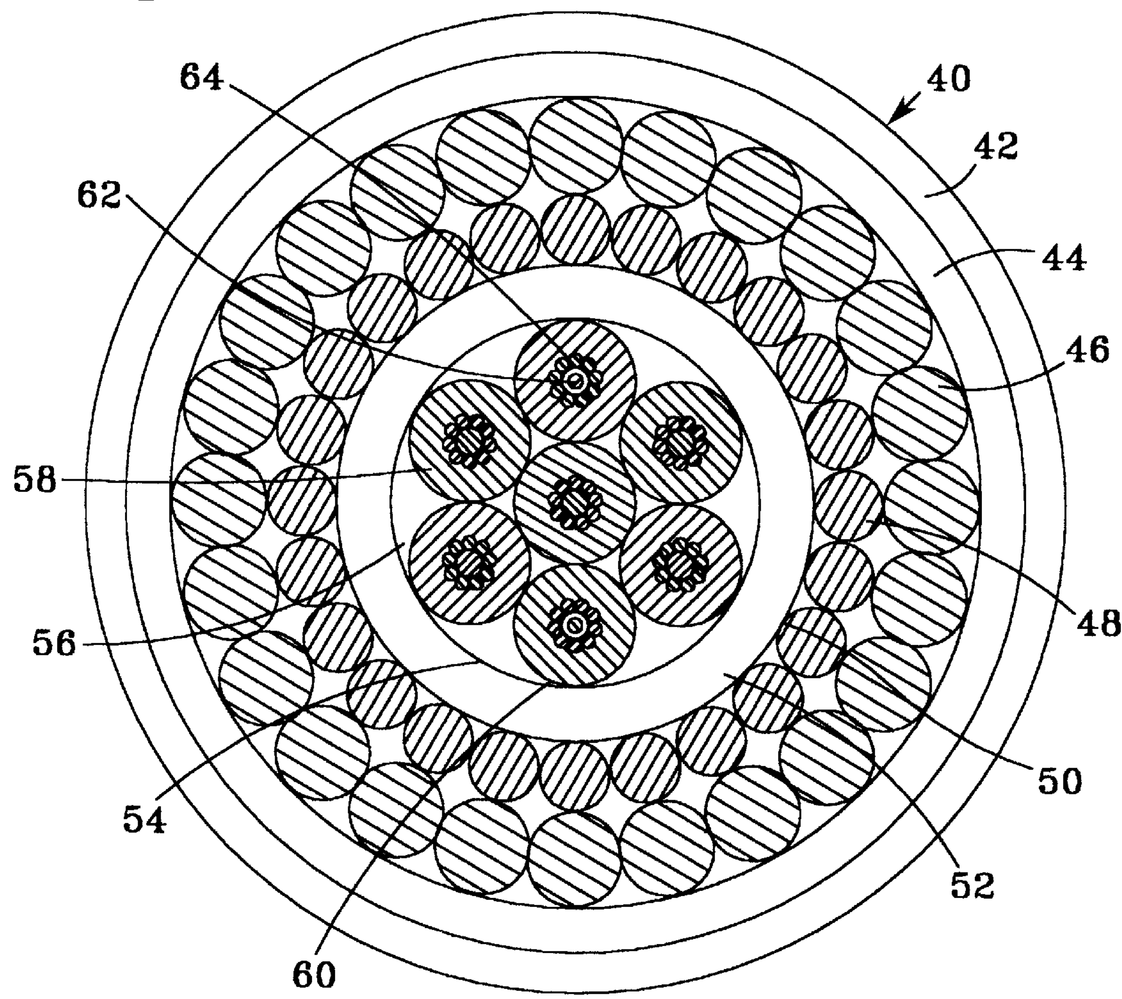
FIG. 4 is a cross-sectional view of a lead-in according to the present invention.

FIG. 4 shows a cross-section view of a seismic cable lead-in 40 according to the present invention with an outer bend restricting body 42; and outer jacket 44; a first layer 46 of armor wires; a second layer 48 of armor wires; a mylar tape tube 50; a space 52; a mylar tape tube 54; and a central bundle 56 with a plurality of electrical elements and optical elements.

Five electrical conductor elements 58 in the central bundle 56 are like such elements described in U.S. Pat. No. 5,495,547 which description is incorporated fully herein for all purposes. Two conductor elements 60, also as described in U.S. Pat. No. 5,495,547, have an optical fiber 62 encased in a metal tube 64 (as described in U.S. Pat. No. 5,495,547). Void spaces in the bundle 56 and/or void spaces between armor wires, are filled with known fillers. The space 52 is filled with fluid (e.g. but not limited to, air) under pressure to isolate the central bundle 56 and its components from loads applied to and/or through the armor wire layers 46 and 48.

The present invention, therefore, in at least certain preferred embodiments, provides a seismic lead-in for a seismic streamer cable, the lead-in having at least one stress member, the at least one stress member having an interior surface, a first sealing member adjacent the interior surface of the at least one stress member, at least one transmission element positioned within the at least one stress member, the at least one transmission element having an outer surface, a second sealing member adjacent the outer surface of the at least one transmission element, and a fluid in a space, the space defined by and between the first sealing member and the second sealing member; such a lead-in wherein the at least one stress member includes a plurality of armor wires helically wound along a length of the lead-in; such a lead-in wherein the at least one transmission element includes a plurality of electrical conductors; such a lead-in wherein the at least one transmission element includes at least one fiber optic transmission element; such a lead-in wherein the fluid is a gas under pressure, a liquid, or a liquid under pressure; such a lead-in wherein the lead-in has two spaced apart ends and the lead-in has an end housing enclosing at least one of the end of the lead-in, in one aspect wherein the at least one end is both ends and an end housing encloses each end; such a lead-in with a port through the housing extending to the space for introducing fluid into the space and for removing it therefrom; any such lead-in with apparatus for selectively controlling fluid flow in the port.

In one aspect, the present invention provides a seismic lead-in for a seismic streamer cable, the lead-in having at least one stress member, the at least one stress member having an interior surface and including a plurality of armor wires helically wound along a length of the lead-in, a first sealing member adjacent the interior surface of the at least one stress member, at least one transmission element positioned within the at least one stress member, the at least one transmission element having an outer surface and including a plurality of electrical conductors, and at least one fiber optic transmission element, a second sealing member adjacent the outer surface of the at least one transmission element, a gas under pressure in a space, the space defined by and between the first sealing member and the second sealing member, a housing enclosing the at least one stress member, the at least one transmission element, and the fluid in the space, a port through the housing extending to the space for selectively introducing fluid into the space and for removing it therefrom, and valve apparatus for selectively controlling fluid flow in the port.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. A seismic lead-in for a seismic streamer cable, the lead-in comprising:

at least one stress member, said stress member having an interior surface;

a first sealing member adjacent the interior surface of said stress member;

at least one transmission element positioned within said stress member, said transmission element having an outer surface;

a second sealing member adjacent the outer surface of said transmission element for defining an interior volume between said first and second sealing members; and a fluid under pressure in said interior volume between said first sealing member and said second sealing member.

2. The lead-in of claim 1 wherein the at least one stress member includes a plurality of armor wires helically wound along a length of the lead-in.

3. The lead-in of claim 1 wherein the at least one transmission element includes a plurality of electrical conductors.

4. The lead-in of claim 1 wherein the at least one transmission element includes at least one fiber optic transmission element.

5. The lead-in of claim 1 wherein the fluid is a gas under pressure in of at least 2000 psi.

6. The lead-in of claim 1 wherein the fluid is a liquid.

7. The lead-in of claim 1 wherein the liquid is under pressure of at least 2000 psi.

8. The lead-in of claim 1 wherein the lead-in has two spaced apart ends and the lead-in further comprising an end housing enclosing at least one of the end of the lead-in.

9. The lead-in of claim 8 wherein the at least one end is both ends and an end housing encloses each end.

10. The lead-in of claim 8 further comprising a port through the housing in contact with said interior volume for introducing fluid into said interior volume and for removing it therefrom.

11. The lead-in of claim 10 further comprising valve apparatus for selectively controlling fluid flow in the port.

12. A seismic lead-in for a seismic streamer cable, the lead-in comprising;

at least one stress member, said stress member having an interior surface and including a plurality of armor wires helically wound along a length of the lead-in;

a first sealing member adjacent the interior surface of said stress member;

at least one transmission element positioned within said stress member, said transmission element having an outer surface and including a plurality of electrical conductors and at least one fiber optic transmission element;

a second sealing member adjacent the outer surface of said transmission element;

a gas under pressure in an interior volume defined by and between the said sealing member and said second sealing member;

a housing enclosing said one stress member, said transmission element, and the gas in said interior volume;

a port through the housing extending to said interior volume for selectively introducing gas under pressure into said interior volume and for removing it therefrom; and valve apparatus for selectively controlling gas flow through the port.

* * * * *